(12) United States Patent
Choi et al.

(10) Patent No.: US 10,509,590 B2
(45) Date of Patent: Dec. 17, 2019

(54) MEMORY SYSTEM AND OPERATION METHOD THEREOF

(71) Applicant: SK hynix Inc., Gyeonggi-do (KR)

(72) Inventors: An-Ho Choi, Gyeonggi-do (KR); Jun-Seop Chung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 107 days.

(21) Appl. No.: 15/645,341

(22) Filed: Jul. 10, 2017

(65) Prior Publication Data

US 2018/0173462 A1 Jun. 21, 2018

(30) Foreign Application Priority Data

Dec. 15, 2016 (KR) .................. 10-2016-0171720

(51) Int. Cl.
*G06F 12/00* (2006.01)
*G06F 3/06* (2006.01)
(52) U.S. Cl.
CPC ............ *G06F 3/0659* (2013.01); *G06F 3/061* (2013.01); *G06F 3/0679* (2013.01)
(58) Field of Classification Search
None
See application file for complete search history.

(56) References Cited

U.S. PATENT DOCUMENTS

| 9,824,004 | B2* | 11/2017 | Mirichigni | G06F 12/023 |
|---|---|---|---|---|
| 2013/0013840 | A1* | 1/2013 | Buxton | G06F 3/061 |
| | | | | 710/308 |
| 2014/0223071 | A1 | 8/2014 | Bert et al. | |
| 2014/0223116 | A1* | 8/2014 | Jeddeloh | G06F 13/1626 |
| | | | | 711/158 |
| 2015/0234601 | A1* | 8/2015 | Tsai | G06F 3/0611 |
| | | | | 711/103 |
| 2018/0260115 | A1* | 9/2018 | Hara | G06F 3/061 |
| 2018/0275872 | A1* | 9/2018 | Benisty | G06F 3/061 |

FOREIGN PATENT DOCUMENTS

| KR | 1020130114486 | 10/2013 |
|---|---|---|
| KR | 1020150000735 | 1/2015 |

* cited by examiner

*Primary Examiner* — John A Lane
(74) *Attorney, Agent, or Firm* — IP & T Group LLP

(57) ABSTRACT

Provided are a memory control device and a method. The memory control device may include a memory device, and a controller operatively coupled to the memory device. The controller may include a receiving unit configured to receive a plurality of commands from a host, and a command processing unit configured to process the commands and order the host to transmit next commands when processing of the commands reaches a trigger point.

26 Claims, 12 Drawing Sheets

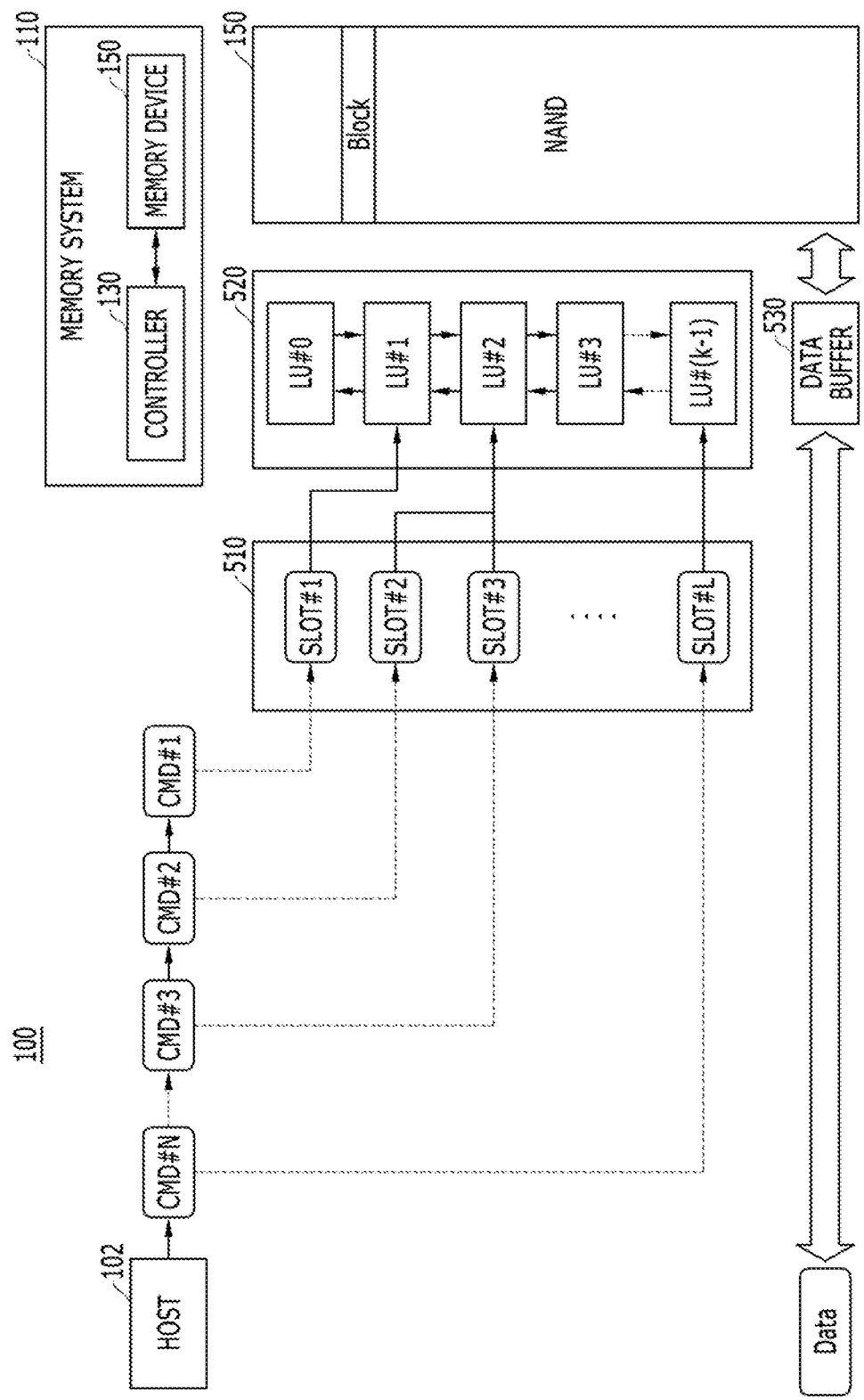

MEMORY SYSTEM AND OPERATION METHOD THEREOF

CROSS-REFERENCE TO RELATED APPLICATIONS

The present application claims priority of Korean Patent Application No. 10-2016-0171720, filed on Dec. 15, 2016, which is incorporated herein by reference in its entirety.

BACKGROUND

1. Field

Exemplary embodiments relate to a memory system and a method capable of controlling an operation of a memory device.

2. Description of the Related Art

The computer environment paradigm has shifted to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system is often also referred to as a data storage device. The memory system may be used as a main memory or an auxiliary memory of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

In a data storage device such as a SSD, a controller may control a memory device on the basis of commands received from a host for performing data read and write operations.

The Quality of Service (QoS) of a memory system relates to the performance characteristics of the one or more memory devices employed by the memory system. For example, a QoS parameter may include an average read latency per minute. The read latency may include the time period from the time the host transmits a read command to the controller to the time that the controller reads the requested data form the memory device (for example, a NAND flash memory device) and transfers the data to the host.

When processing a plurality of commands on the basis of a queue operation, the controller may receive the plurality of commands from the host, buffer the commands in a queue, sequentially process the buffered commands, and upon completing the processing of the buffered commands may then request (order or response) the host to transmit a next set of commands. In such a case, the read latency may increase and thus the QoS performance of the memory system may be deteriorated.

SUMMARY

Various embodiments are directed to a memory system and method capable of processing a plurality of data requests received from a host in a more efficient manner. The memory system may buffer a set of received commands and continuously process the buffered commands without ordering a host to transmit a next set of commands until a trigger point is reached. The system may order a host to transmit commands when a trigger point is reached, rearrange the received commands according to priorities, and process the commands.

In an embodiment, a memory system may include a memory device and a controller operatively coupled to the memory device. The controller may include a receiving unit that receives a plurality of commands for the memory device from a host, and a command processing unit that processes the commands, and orders the host to transmit next commands when processing of the commands reaches a trigger point.

In an embodiment, a memory controller may include a receiving unit that receives a plurality of commands for a memory device from a host, and a command processing unit that processes the commands, and orders the host to transmit next commands when processing of the commands reaches a trigger point.

In an embodiment, an operation method of a memory system may include receiving a plurality of commands for a memory device from a host, processing the commands, and ordering the host to transmit next commands when processing of the commands reaches a trigger point.

BRIEF DESCRIPTION OF THE DRAWINGS

FIG. 5 is a diagram illustrating a data processing system including a memory system, in accordance with an embodiment of the present disclosure.

DETAILED DESCRIPTION

Figure 1:
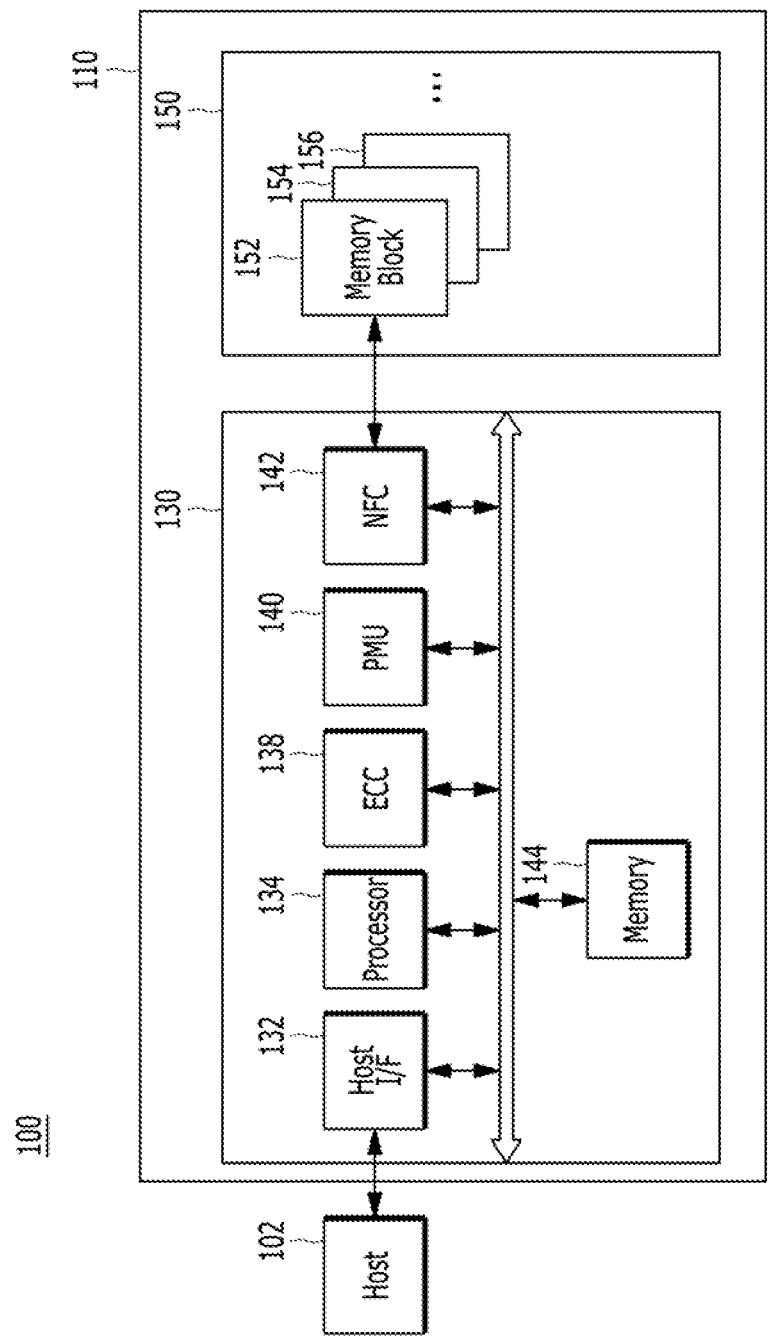
FIG. 1 is a block diagram illustrating a data processing system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, b, and C.

Spatially relative terms, such as "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in manufacturing, use or operation in addition to the orientation depicted in the figures. For example, if the device in the figures is turned over, elements described as "below" or "under" other elements or features would then be "above" the other elements or features. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

When a drawing or a detailed description describes a multi-layer structure having two or more layers, the relative positional relationship or arrangement order of the illustrated layers just reflects a particular embodiment and does not limit the concept and spirit of the present invention. Also, the drawing or the detailed description of the multi-layer structure may not reflect all the layers existing in a particular multi-layer structure (for example, there may be one or more additional layers between the two illustrated layers). For example, when a first layer is referred to as being "on" a second layer or "on" a substrate, it not only refers to a case where the first layer is formed directly on the second layer or the substrate but also a case where a third layer exists between the first layer and the second layer or between the first layer and the substrate.

Hereinafter, embodiments will be described in more detail with reference to the accompanying drawings.

FIG. 1 illustrates a data processing system 100 including a memory system 110, according to an embodiment of the present invention.

Referring to FIG. 1, the data processing system 100 may also include a host 102 operatively coupled to the memory system 110.

The host 102 may be any suitable electronic device including, for example, a portable electronic device such as a mobile phone, an MP3 player and a laptop computer or a non-portable electronic device such as a desktop computer, a game player, a television (TV) and a projector.

The memory system 110 may operate in response to a request received from the host 102. For example, the memory system 110 may store data to be accessed by the host 102 in response to a write request received from the host. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as a solid-state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 operatively coupled to a controller 130. The memory device 150 may store data to be accessed by the host 102, and the controller 130 may control data exchange between the memory device 150 and the host 102.

The controller 130 and the memory device 150 may be integrated into a single semiconductor device. For instance, the controller 130 and the memory device 150 may be integrated into a single semiconductor device to form a solid-state drive (SSD).

The controller 130 and the memory device 150 may be integrated into a single semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 and the memory device 150 may have a hardware structure separate from each other as indicated in the embodiment of FIG. 1. In this configuration, the controller 130 may be a main control unit or an auxiliary control unit for an electronic device. The electronic device may be the host 102 or include some function of the host 102. For another instance, the electronic device may be an independent device physically separate from the host 102. The memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 of the memory system 110 may retain stored data even when power is blocked, store the data provided from the host 102 during a write operation, and provide stored data to the host 102 during a read operation. The memory device 150 may include at least one memory block or a plurality of memory blocks, for example, 152, 154 and 156. The memory device 150 may be a non-volatile memory device, for example, a flash memory device.

The controller 130 of the memory system 110 may control the memory device 150 in response to a request received from the host 102. The controller 130 may provide the data read from the memory device 150, to the host 102, and store the data provided from the host 102 into the memory device 150. To this end, the controller 130 may control the various operations of the memory device 150, including, for example, read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144, all operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than a threshold number of correctable error bits, and may output an error correction fall signal indicating failure in correcting the error bits.

The ECC unit 138 may perform an error correction operation based on any suitable method including a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request received from the host 102. The NFC 142 may generate control signals for the memory device 150 and process data under the control of the processor 134 when the memory device 150 is a flash memory. In particular, when the memory device 150 is a NAND flash memory, the NFC 142 may generate control signals for the memory device 150 and process data under the control of the processor 134. When the memory device 150 is not a NAND flash memory, other well-known memory interfaces may be employed that are suitable for serving as a memory interface between the controller 130 and the memory device 150 for allowing the controller 130 to control the memory device 150 in response to a request received from the host 102.

The memory 144 may serve as a working memory of the memory system 110 and the controller 130, and store data for driving the memory system 110 and the controller 130. The controller 130 may control the memory device 150 in response to a request received from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with a volatile memory such as a static random access memory (SRAM) or a dynamic random access memory (DRAM). As described above, the memory 144 may store data used by the host 102 and the memory device 150 for the read and write operations. For such storage of the data, the memory 144 may include a program memory, a data memory, a write buffer, a read buffer, a map buffer, and so forth.

The processor 134 may control the various operations of the memory system 110, including a write operation or a read operation for the memory device 150, in response to a write request or a read request received from the host 102. The processor 134 may drive firmware, which is referred to as a flash translation layer (FTL), to control the general operations of the memory system 110. The processor 134 may be implemented with a microprocessor or a central processing unit (CPU).

Figure 2:
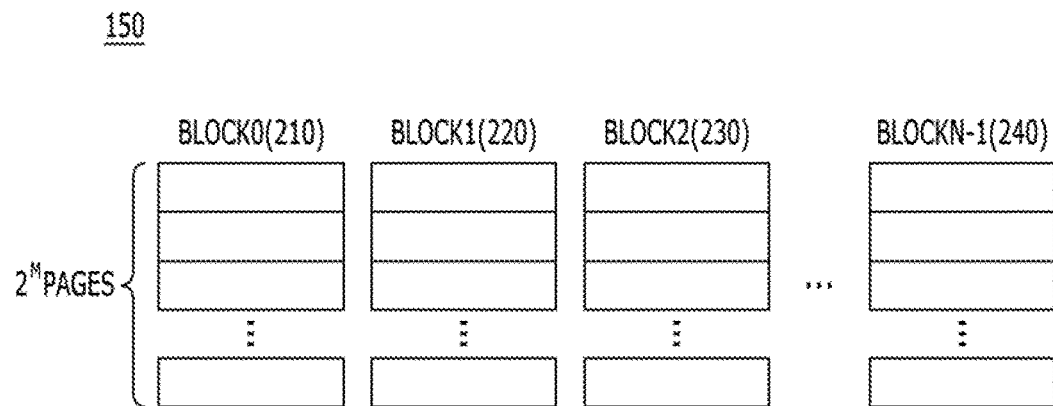
FIG. 2 is a diagram illustrating an exemplary configuration of a memory device employed in the memory system shown in FIG. 1.
Figure 3:
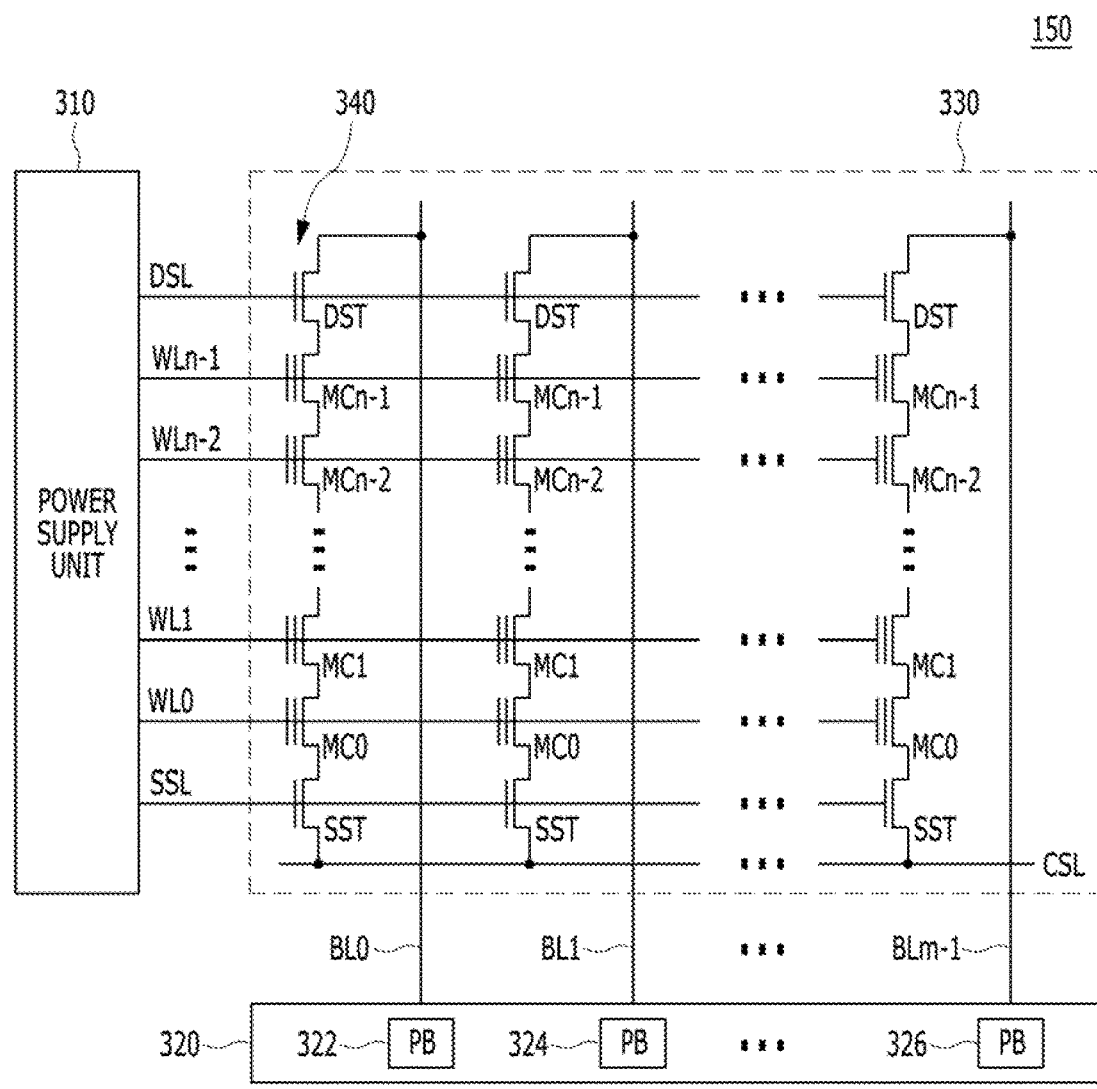
FIG. 3 is a circuit diagram illustrating a memory block in a memory device, according to an embodiment of the present invention.
Figure 4:
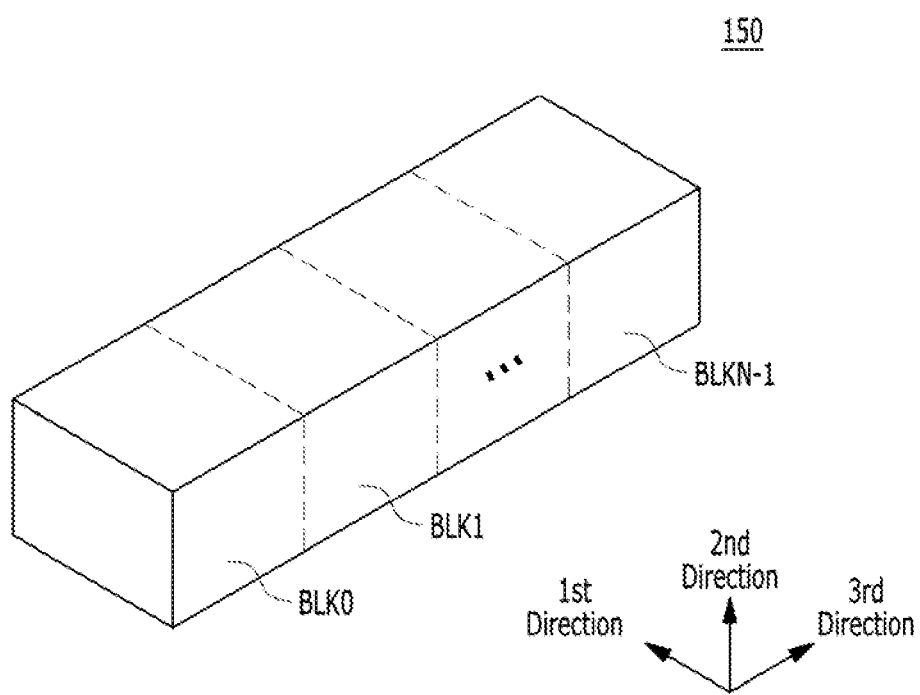
FIG. 4 is a diagram illustrating a three dimensional configuration of the memory blocks of the memory device shown in FIG. 2, according to an embodiment of the present invention.

FIG. 2 is a diagram illustrating a configuration example of the memory device 150 of FIG. 1, according to an embodiment of the present invention. FIG. 3 is a circuit diagram illustrating a memory block 152 of the memory device 150 in FIG. 1. FIG. 4 is a block diagram illustrating an example of the memory device 150 of FIG. 1.

Referring to FIG. 2, the memory device 150 may include a plurality of memory blocks 210 to 240. For example, the memory device 150 may include zeroth to $(N-1)^{th}$ memory blocks 210 to 240. Each of the plurality of memory blocks 210 to 240 may include a plurality of pages. For example, each of the plurality of memory blocks 210 to 240 may include $2^M$ number of pages ($2^M$ PAGES), to which the present invention will not be limited. Each of the plurality of pages may include a plurality of memory cells electrically coupled to a word line.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data for example, two or more-bit data. The MLC memory block including a plurality of pages which are implemented with memory cells that are each capable of storing 3-bit data may be also referred to as a triple level cell (TLC) memory block.

Each of the plurality of memory blocks 210 to 240 may store the data provided from the host 102 during a write operation, and may provide stored data to the host 102 during a read operation.

Referring to FIG. 3, the memory block 152 of the memory device 150 may include a plurality of cell strings 340 which are electrically coupled to a plurality of bit lines BL0 to BLm−1, respectively. Each cell string 340 may include at least one drain select transistor DST and at least one source select transistor SST. Each cell string 340 may also include a plurality of memory cells MC0 to MCn−1 or a plurality of memory cell transistors electrically coupled in series between the at least one drain select transistor DST and the at least one source select transistor SST. Each of the memory cells MC0 to MCn−1 may be configured by a multi-level cell (MLC) which stores data information as a plurality of bits. Each of the strings 340 may be electrically coupled to a corresponding bit line among the plurality of bit lines BL0 to BLm−1. For reference, in FIG. 3, 'DSL' may denote a drain select line, 'SSL' may denote a source select line, and 'CSL' may denote a common source line.

While FIG. 3 illustrates, as an example, the memory block 152 of the memory device 150 which is configured by NAND flash memory cells, it is noted that the memory block 152 is not limited to NAND flash memory cells. For example, according to other embodiments, the memory block 152 may be implemented with NOR flash memory cells or hybrid flash memory cells in which at least two kinds of memory cells are combined. In an embodiment, the memory block 152 may be implemented as a one-NAND flash memory in which a controller is built in a memory chip. In an embodiment, the memory device 152 may be a flash memory device in which a charge storing layer is configured by conductive floating gates. In an embodiment, the memory device 152 may be a charge trap flash (CTF) in which a charge storing layer is configured by a dielectric layer.

A voltage supply block 310 of the memory device 150 may provide word line voltages such as a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during a program operation, and may drive the bit lines according to the received data. To this end, the read/write circuit 320 may include a plurality of page buffers 322, 324 and 326 respectively corresponding to columns or bit lines, or pairs of columns or pairs of bit lines, and a plurality of latches (not shown) may be included in each of the page buffers 322, 324 and 326.

Referring to FIG. 4, the memory device 150 may include a plurality of memory blocks BLK0 to BLKN−1, each of the memory blocks BLK0 to BLKN−1 being implemented in a three-dimensional (3D) structure also referred to as a vertical structure. Each of the memory blocks BLK0 to BLKN−1 may include structures which extend in first to third directions.

The respective memory blocks BLK0 to BLKN−1 may include a plurality of cell strings, for example, a plurality of NAND strings, each cell string extending in the second direction such as, in the vertical direction. The plurality of NAND strings may be spaced apart at regular intervals in the first and second directions.

Each NAND string may be electrically coupled to a bit line, at least one source select line or at least one ground select line, at least one drain select line or at least one string select line, a plurality of word lines, at least one dummy word line, and a common source line. That is, the respective memory blocks BLK0 to BLKN−1 may be electrically coupled to a plurality of bit lines, a plurality of source select lines, a plurality of drain select lines, a plurality of word lines, a plurality of dummy word lines, and a plurality of common source lines.

According to an embodiment of the present invention of the present disclosure, the host 102 of FIG. 1 may transmit commands CMDs to the controller 130. The controller 130 may buffer (or queue) the commands received from the host 102 and sequentially transmit the commands to the memory device 150, thereby controlling the commands to be performed. In some embodiments, the commands may be read and write commands. When the memory device 150 completely performs a corresponding operation in response to the received command, the controller 130 may respond (or response or command order) to the host 102. For example, in the case of the read command, the controller 130 may output the read command to the memory device 150, thereby controlling a read operation of the memory device 150. When the read operation is completed in the memory device 150, the controller 130 may order the host 102 to transmit next commands in response to the execution completion of the read command. In such a case, an operation (or command ordering) for responding to the host 102 having completed the processing of respective read commands is repeatedly performed, so that read latency may be delayed by the amount of data to be read, an internal operation of the memory device 150, mapping search, a time required for responding to the host 102, and the like.

According to an embodiment of the present invention of the present disclosure, when a plurality of commands are processed by a queue operation and the like, the controller 130 may not respond to (command order) the host 102 (that is, may not perform an operation for receiving commands from the host 102) until a predetermined trigger point is reached, and may allow a predetermined number of commands to be internally and sequentially processed. When the commands are processed to the trigger point, the controller 130 may order the host 102 to transmit commands to be subsequently performed and may receive a plurality of commands at a time (for example, such that a max queue depth is obtained). The controller 130 may rearrange the received commands and commands (previous commands being buffered) not processed in a previous state, on the basis of preset priorities. Then, the controller 130 may sequentially transmit the commands rearranged in a command queue to the memory device 150, thereby controlling a read or write operation of the memory device 150.

For example, when the max queue depth is set to 32 and the trigger point is set to about 80% of the max queue depth, the controller 130 may not order the host 102 to transmit commands while about 25 commands are being processed. In other words, the controller 130 may sequentially transmit the 25 commands buffered in the command queue to the memory device 150 without ordering next commands, thereby controlling commands to be continuously performed. When the processing of the commands reaches the trigger point (for example, 25 commands are processed the command queue), the controller 130 may order the host 102 to transmit commands so as to correspond to the number (for example, 25) of processed commands. Then, the host 102 may transmit a corresponding number of commands (for example, 25 commands) on the basis of a response of the controller 130. When the commands are received from the host 102, the controller 130 may analyze priorities of the received commands and previous commands, and generate a command queue on the basis of the result. Accordingly, it is possible to control the read and write operation of the memory device 150 on the basis of the newly generated command queue. The trigger point may be optimized on the basis of the performance of the controller 130, system conditions and the like. According to the memory control device and the method according to an embodiment of the present disclosure, it is possible to improve QoS performance by adjusting the response (for example, command ordering) of the controller 130.

FIG. 5 is a diagram illustrating a data processing system 100 including a memory system 110, according to an embodiment of the present invention.

Referring to FIG. 5, the data processing system 100 may include a host 102 and the memory system 110 which is a storage device functioning as a peripheral device of the host 102. The memory system 110 may include the controller 130 and the memory device 150.

The host 102 may generate, a plurality of commands for performing one or more tasks and transmit them to the memory system 110. For instance, the plurality of commands may include an N number of commands CMD#1 to CMD#N. The commands may be performed by the memory system 110. The memory system 110 may exchange the commands and data with the host 102. The commands may pertain to an operation of the memory system 110. For example, although not limited to this, the commands may pertain to search, change, read and write operations of data on the memory system 110, and read and write operations on the memory device 150. In some embodiments, the memory device 150 may be a nonvolatile memory device such as a NAND flash memory. The memory device 150 may include a plurality of memory blocks as data storage regions. Each memory block may comprise a plurality of pages. The blocs may be organized in planes and the planes may be organized in dies. However, this architecture is only an example, and many other well-known architectures may also be used.

The host 102 may communicate data with the memory system 110. The controller 130 may determine a sequence in which the controller 130 exchanges data with the host 102. For this, the controller 130 may include a data buffer 530. For example, the data buffer 530 may be embodied by a static, random-access memory (SRAM). In an embodiment, the data buffer 530 may be included in the memory 144 shown in FIG. 1. In another embodiment, the data buffer 530 may be provided separately from the memory 144.

During a write operation, the controller 130 may store data received from the host 102 in the data buffer 530, and thereafter may transmit the data, according to an order, to a memory block of the memory device 150 and store the data in the memory block. During a read operation, the controller 130 may read data stored in a memory block of the memory device 150, store the read data in the data buffer 530, and thereafter may transmit the data stored in the data buffer 530 to the host 102 according to an order. If the data which are requested to be written or read from the host 102 has been stored in the data buffer 530, then the controller 130 may not perform a write/read operation on the memory device 150.

The controller 130 of the memory system 110 upon receiving the commands from the host 102 may determine the order (also referred to as the sequence) in which the received commands will be performed. For performing these functions, the controller 130 may include a receiving unit 510 and a command processing unit 520.

The receiving unit 510 may receive a plurality of commands from the host 102 through a plurality of slots. For example, the plurality of slots may include an L number of slots SLOT#1 to SLOT#L. In operation, each command may be matched with one corresponding slot.

The command processing unit 520 may reorder the commands received via the slots of the receiving unit 510 and may then perform the reordered commands. For instance, the command processing unit 520 may reorder an execution sequence of the commands based on a priority assigned to each command. To reorder the commands, the command processing unit 520 may include a command queue which is formed of a plurality of logical unit (LU) queues. For example, the plurality of LU queues may include k LU queues LU#0 to LU#(k−1). An LU may be a unit capable of processing a command, and the LU for the memory device 150 may be determined as a unit capable of reading/writing data. For instance, in the case where the memory device 150 is a NAND flash memory, the LU may be determined as 8/16/32 KB in conjunction with a NAND structure. In the case where the memory system 110 uses an LU of 16 KB, the controller 130 may perform a write operation with two 8 KB write commands as one write set. The command processing unit 520 may effectively match the slots including the respective commands received from the host 102 with the LUs which are used by the controller 130, whereby the command processing performance may be enhanced, and the command queue may be processed without missing commands or data.

The command processing unit 520 may request (or order or respond) the host 102 to transmit commands when commands processed in the process of processing commands reach the trigger point, and may rearrange the commands received from the host 102.

According to a command rearrangement method according to an embodiment of the present invention, it is possible to set priorities of commands based on a data size, and to rearrange higher priority commands based on the priorities. In some embodiments, when rearranging the received commands on the basis of priorities, the command processing unit 520 may analyze the received commands and rearrange the commands such that commands having a data size smaller than a reference size have a higher priority than commands having a data size larger than the reference size. Furthermore, when rearranging the received commands, the command processing unit 520 may rearrange the commands based on their type. For example, the command processing unit 520 may rearrange the commands such that a read command has a higher priority than that of a write command. For example, in an embodiment, the command processing unit 520 may first rearrange commands according to their size in a first group having a data size smaller than the reference size, and a second group having a data size larger than the reference size, and may then rearrange the commands in each of the first and second groups so that the read commands in each group have higher priorities than the write commands. Hence, according to this embodiment, the processor may first process the read commands of the first group, may second process the write commands of the first group, may third process the read commands of the second group, and may fourth process the write commands of the second group.

In the case of rearranging commands in such a manner, processing of a write command having a large data size may be delayed, and may also be delayed in a subsequent rearrangement process. In order to substantially prevent a prolonged delay, when subsequent commands are received, the controller 130 may set priorities of commands not processed in a previous state to be high. For example, when rearranging commands which have already been earlier delayed two or more times in the rearrangement operation (hereinafter, these commands are referred also as delayed commands) the delayed commands may be rearranged to have the highest priority.

Figure 6A:
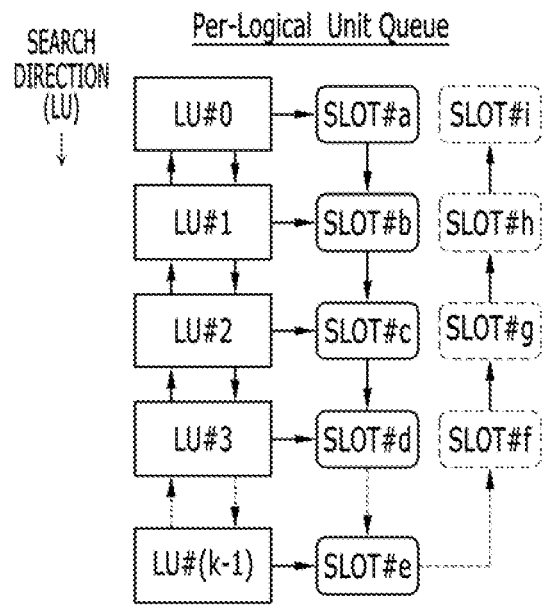
FIGS. 6A and 6B are diagrams illustrating an operation of processing a command for executing a host task in a controller.
Figure 6B:
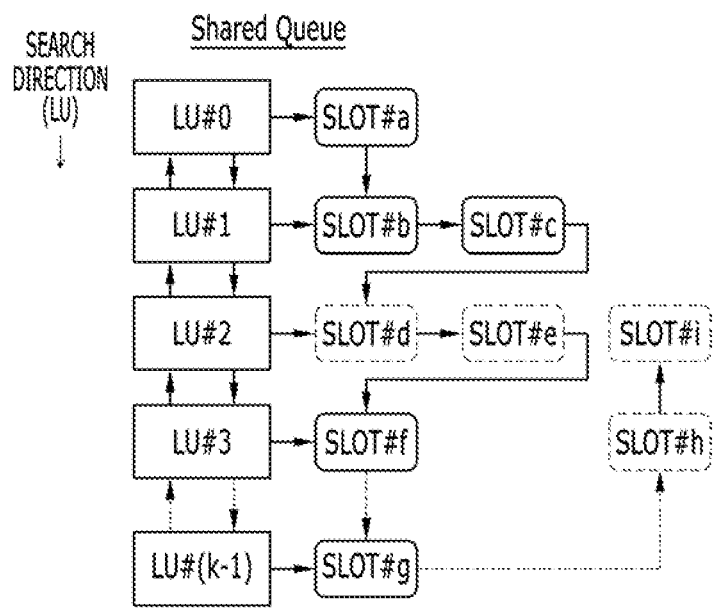

FIGS. 6A and 6B are diagrams illustrating an operation of processing commands for executing a host task in a controller. The command processing operation of FIG. 6A is referred to as a per-logical unit queue method. The command processing operation of FIG. 6B is referred to as a shared queue method.

Referring to FIG. 6A, according to the per-logical unit queue method commands are performed in such a way that they are matched one by one with the LUs (or queues). For example, SLOT#a corresponding to LU#0 is processed, SLOT#b corresponding to LU#1 is processed, SLOT#c corresponding to LU#2 is processed, and SLOT#d corresponding to LU#3 is processed. Subsequently, SLOT#e corresponding to LU#(k−1) is processed. Thereafter, SLOT#f corresponding to LU#3 may be processed, SLOT#g corresponding to LU#2 may be processed, SLOT#h corresponding to LU#1 may be processed, and SLOT#i corresponding to LU#0 may be processed. In accordance with the per-logical unit queue method, the controller 130 may respectively match commands received from the host 102 with a plurality of LUs (or queues) for the memory device 150, store the commands in the LUs, and sequentially search and process the queues of the LUs. This method may be advantageous in the case where the host 102 efficiently uses the LUs of the controller 130.

Referring to FIG. 6B, according to the shared queue method commands (or slots) are stored in the LUs (or queues) in a sequence in which the commands are received, and then performed. For example, SLOT#a corresponding to LU#0 is processed, SLOT#b and SLOT#c corresponding to LU#1 is processed, SLOT#d and SLOT#e corresponding to LU#2 is processed, and SLOT#f corresponding to LU#3 is processed. Subsequently, SLOT#g corresponding to LU#(k−1) is processed. Thereafter, SLOT#h corresponding to LU#3 may be processed, and SLOT#i corresponding to LU#2 may be processed. In accordance with the shared queue method, the controller 130 may store commands received from the host 102 in the plurality of LUs (or queues) for the memory device 150 in a sequence in which the commands are received, and then may process the commands.

Figure 7:
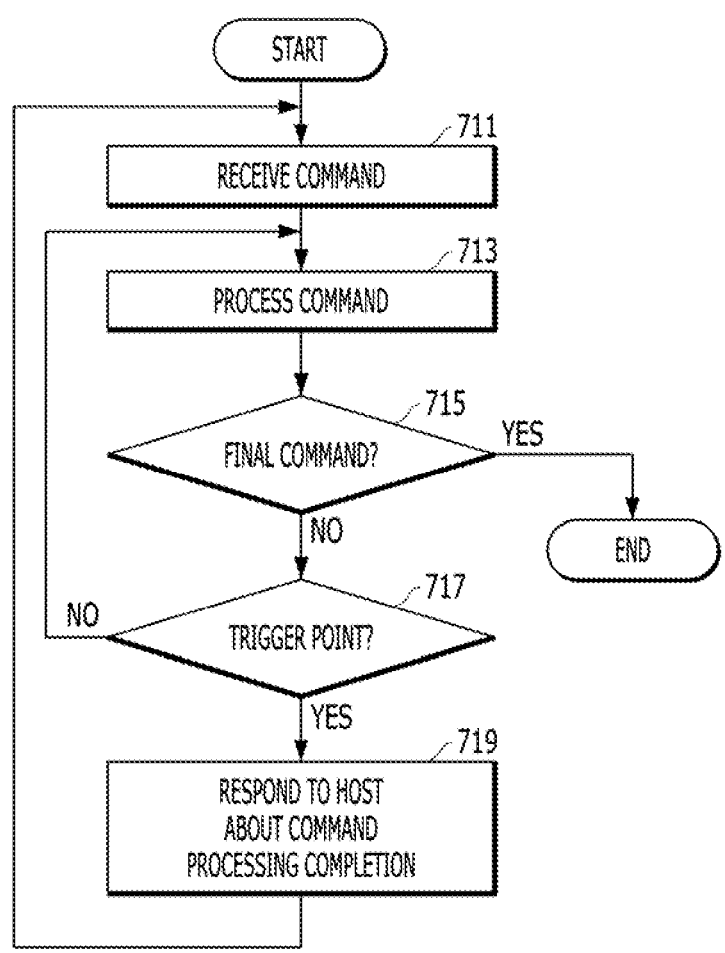
FIG. 7 is a flowchart illustrating a method of processing a plurality of commands according to an embodiment of the present invention.

FIG. 7 is a flowchart illustrating a procedure in which a controller of a memory system according to an embodiment of the present invention processes commands. For example, the procedure of FIG. 7 may be performed by the controller 130 of the memory system 110 in FIG. 5.

Referring to FIG. 7, when commands are received from the host 102, the controller 130 of the memory system 110 may recognize the commands in step 711 and process the received commands in step 713. After the commands are processed, the controller 130 may determine whether a command processing amount of a queue buffer (e.g., the data buffer 530 of FIG. 5) has reached a trigger point. When it is determined that the command processing amount of the queue buffer has not reached the trigger point, the controller 130 may transmit a next command buffered in the queue buffer to the memory device 150 so as to process the next command in step 713. That is, the controller 130 may not respond to the host 102 until the command processing amount reaches the trigger point in command processing, and control the memory device 150 such that commands are continuously processed according to an order of the buffered commands in the queue buffer.

When it is determined that the command processing amount of the queue buffer reaches the trigger point, the controller 130 may recognize this in step 717 and respond to the host 102 about command processing completion in step 719. The response information may include command order information. The command order information may include command number information for allowing the queue buffer to reach a max queue depth. When the command order information is received, the host 102 may transmit commands corresponding to the command number included in the command order information to the controller 130. The trigger point may be set to be smaller than the max queue depth. For example, the trigger point may be set to about 80% of the max queue depth. When the max queue depth is assumed to be 32, the trigger point may be set to about 25. In such a case, when 25 commands buffered in the queue buffer are processed, the controller 130 may recognize that it has reached the trigger point, and order the host 102 to transmit next commands.

When the command order information is received, the host 102 may continuously transmit commands, which correspond to the number ordered by the controller 130, to the controller 130. However, when there are no commands to be transmitted to the controller 130, even though a command order occurs, the host 102 may not transmit commands. In such a case, the controller 130 may not receive commands from the host 102 even in the state in which all commands buffered in the queue buffer have been processed. Accordingly, when the final command is processed, the controller 130 may recognize this in step 715 and end the command processing operation of the memory device 150.

Figure 8:
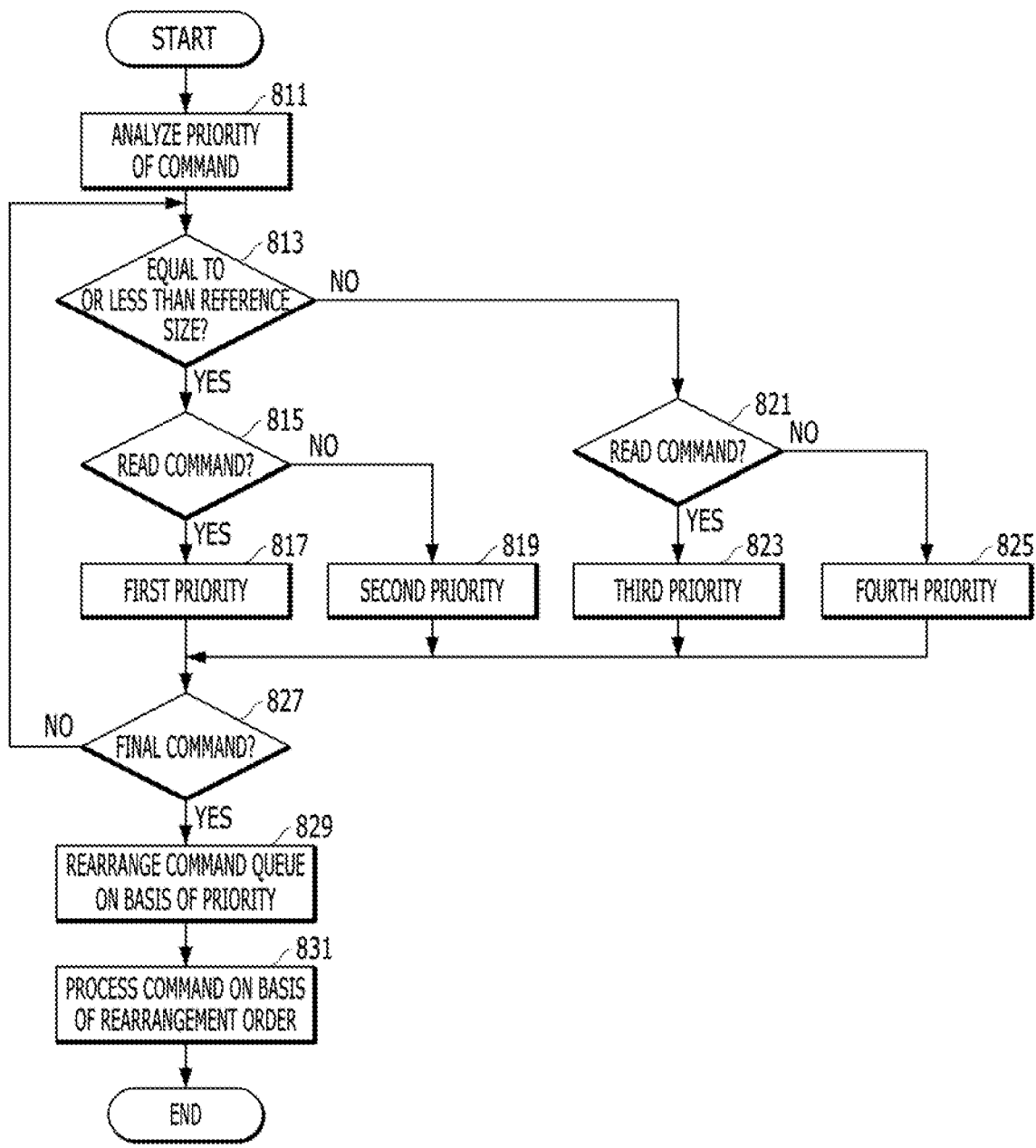
FIG. 8 is a diagram illustrating an exemplary operation of rearranging commands according to an embodiment of the present invention.

FIG. 8 is a diagram illustrating an example of an operation of rearranging commands according to an embodiment of the present invention. For example, the operation of FIG. 8 may be performed by the host 102 and the controller 130 of the memory system 110 in FIG. 5.

Referring to FIG. 8, when the command processing amount reaches the trigger point, the controller 130 may request transmission of subsequent commands to the host 102. The number of requested (ordered) commands may depend on the trigger point. The host 102 may transmit a corresponding number of commands according to the request of the controller 130. When the commands are received from the host 102, the controller 130 may analyze priorities of the received commands in step 811. The received commands may be at least one of read commands and write commands. Information regarding command may include address information for accessing data. The controller 130 may analyze addresses and check data size based on the analyzed addresses.

The controller 130 may set priorities of commands processable in a short time to be high. When an execution time of the read command is delayed, read latency may increase. According to an embodiment of the present invention, the controller 130 may set priorities of commands having a small data size to be high and set a priority of a read command to be higher than that of a write command. The controller may analyze the priority of a command in step 811, and when the data size of a command is smaller than a reference size, the controller 130 may recognize this in step 813 and may then determine a command type in step 815. When it is determined that the command type is the read command having a data size smaller than the reference size, the controller 130 may set the priority of the read command as a first priority in step 817. When it is determined that the command type is the write command having a data size smaller than the reference size, the controller 130 may set the priority of the write command as a second priority in step 819. When it is determined that the command type is a command having a data size larger than the reference size, the controller 130 may recognize this in step 813 and determine a command type in step 821. When it is determined that the command type is the read command having a data size larger than the reference size, the controller 130 may set the priority of the read command as a third priority in step 823. When it is determined that the command type is the write command having a data size larger than the reference size, the controller 130 may set the priority of the write command as a fourth priority in step 825.

The controller 130 repeatedly performs steps 813, 815, 817, 819, 821, 823, and 825, thereby deciding priorities of received commands and commands not previously processed. When a priority of a final command is decided, the controller 130 may recognize this in step 827 and rearrange commands on the basis of the decided priority to generate a rearrangement command queue in step 829. In step 831, the controller 130 may sequentially control command execution of the memory device 150 on the basis of the rearrangement command queue.

Figure 9:
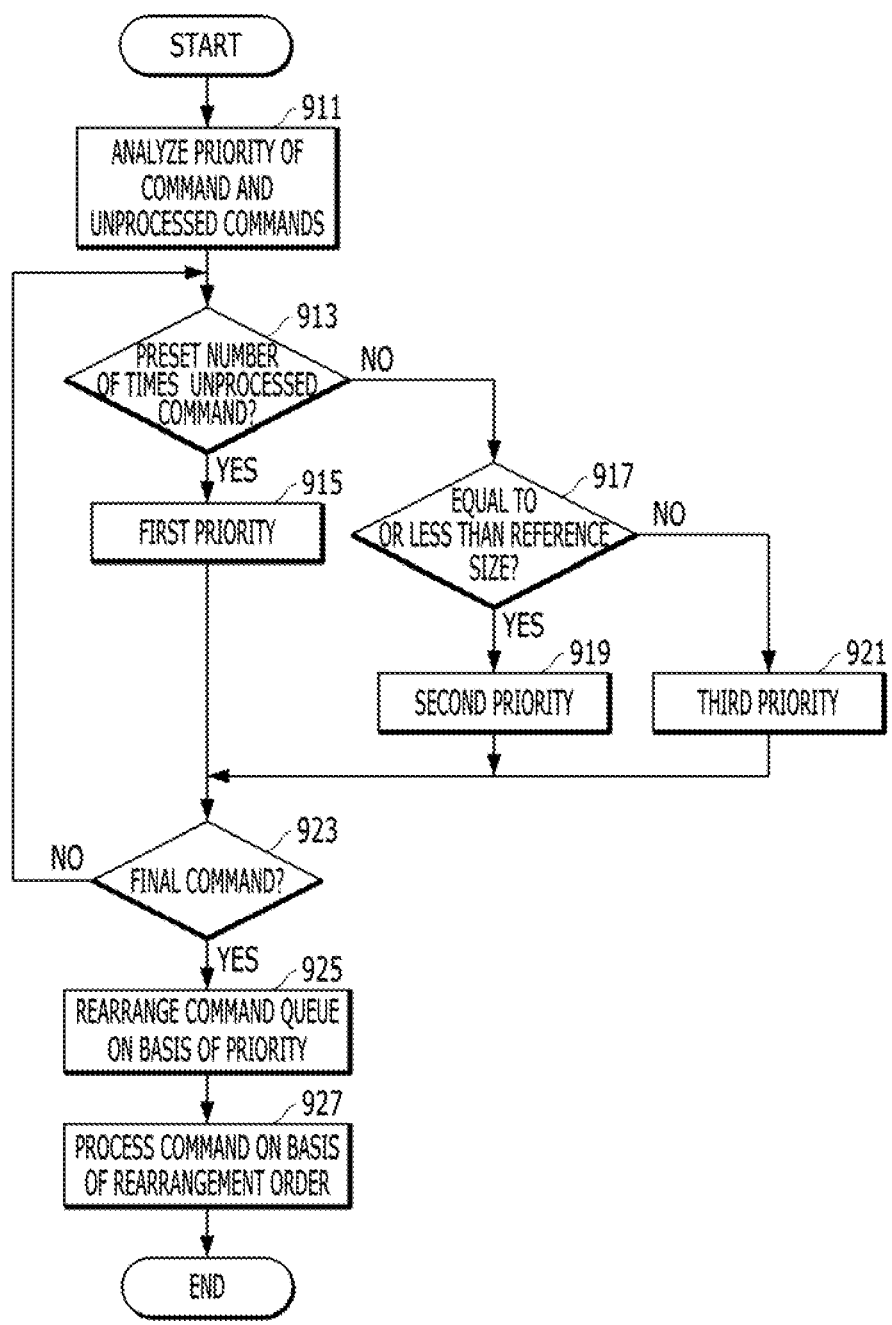
FIG. 9 is a diagram illustrating another exemplary operation of rearranging commands according to an embodiment of the present invention.

FIG. 9 is a diagram illustrating another example of an operation of rearranging commands according to an embodiment of the present invention. For example, the operation of FIG. 9 may be performed by the host 102 and the controller 130 of the memory system 110 in FIG. 5.

Referring to FIG. 9, the controller 130 may analyze priorities of commands received from the host 102 and unprocessed commands in a previous state in step 911. The commands not processed in the previous state may be write (or read) commands having a large data size. When data sizes of the commands received from the host 102 are smaller than those of the unprocessed commands, the unprocessed commands may be set to have a low priority and may not be processed. Accordingly, the unprocessed commands need to have high priorities at an appropriate time point. When commands received at trigger points are rearranged, the controller 130 may analyze the number of times by which previously unprocessed commands have not been processed and adjust a command exceeding a preset unprocessed number of times (for example, twice) to have the highest priority.

When recognizing an unprocessed command exceeding a preset number of times in step 913, the controller 130 may set a priority of the unprocessed command to be the highest priority (i.e., a first priority) in step 915. When it is not the unprocessed command, the controller 130 may determine whether a data size of the command is equal to or less than a reference size in step 917. When the data size of the command is equal to or less than the reference size, the controller 130 may set the command to have a second priority in step 919. When the data size of the command exceeds the reference size, the controller 130 may set the command to have a third priority in step 921. Furthermore, when it is a command having a data size equal to or less than the reference size, the controller 130 may set a priority of a read command to be higher than that of a write command. Even when it is a command having a data size exceeding the reference size, the controller 130 may set the priority of the read command to be higher than that of the write command.

The controller 130 repeatedly performs steps 913, 915, 917, 919, and 921, thereby deciding priorities of received commands and commands not previously processed. When a priority of a final command is decided, the controller 130 may recognize this in step 923 and rearrange commands on the basis of the decided priority to generate a rearrangement command queue in step 925. In step 927, the controller 130 may sequentially control command processing of the memory device 150 on the basis of the rearrangement command queue.

Although not illustrated in the drawing, in the case of rearranging commands from the host 102, when a mixed command including write commands and read commands is received, the controller 130 may store all continuous write commands in the memory device without receiving subsequent commands, and then rearrange the commands such that the subsequent commands are received, and receive continuous read commands up to the max queue of the queue buffer, thereby optimizing the performance of the mixed command.

Figure 10:
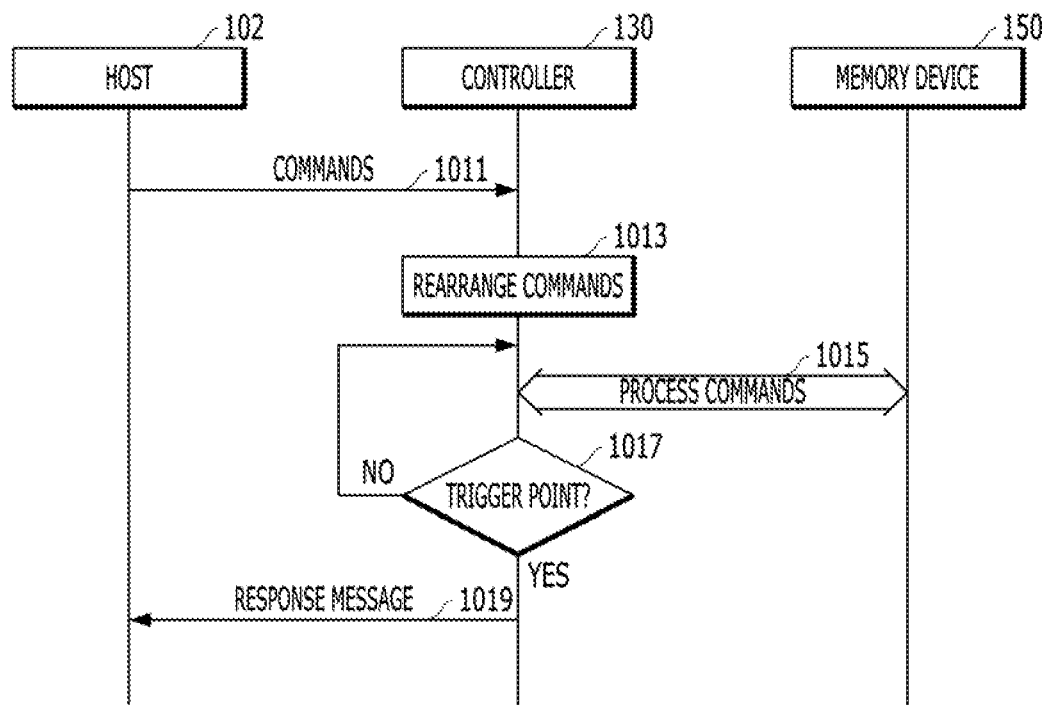
FIG. 10 is a diagram illustrating a command processing method of a data processing system according to an embodiment of the present invention.

FIG. 10 is a diagram illustrating a command processing method of a data processing system according to an embodiment of the present invention. For example, the command processing method of FIG. 10 may be performed by the data processing system 100 in FIG. 5.

Referring to FIG. 10, the host 102 may transmit commands to the controller 130 in step 1011. In an initial command transmission, the host 102 may transmit commands of a number corresponding to the max queue of a queue buffer (e.g., the data buffer 530) included in the controller 130. When it is based on a request (or order) of the controller 130, the host 102 may transmit commands in a number requested by the controller 130. Where there are no commands to be transmitted to the controller 130, the host 102 may transmit no commands.

When the commands are received from the host 102, the controller 130 may rearrange the received commands to generate a command queue in step 1013. According to the command rearrangement method, it is possible to analyze data sizes on the basis of address information included in command information and to decide priorities of the commands on the basis of the analyzed data sizes. According to the command rearrangement method, it is possible to decide the priorities of the commands on the basis of the command type (for example, a read or write command). According to the command rearrangement method, it is possible to set priorities of delayed commands not previously performed to be high. When the received commands are mixed command, meaning that there are read and write commands it is possible to decide their priority according to their type as explained above. The controller 130 may store the commands rearranged according to their priorities in the queue buffer to generate a command queue. The controller 130 may sequentially control the memory device 150 according to the order of the command queue in step 1015. While a read or a write operation is being performed, the controller 130 may analyze a command processing amount and determine whether a trigger point has been reached in step 1017. The trigger point may be set on the basis of a max queue value N of the queue buffer and the number Q of processed commands. For example, the trigger point may be set as a percentage of the max queue value N. The trigger point may be set on the basis of the performance of the controller 130, conditions of a memory system, and the like. For example, the trigger point may be set to about 80% of the max queue value N. Hence, when N is set to 32 and the trigger point is set to about 80%, the trigger point is reached when Q is about 25.

The trigger point may be set to equal a preset number of processed commands Q which may change based on the max queue value N. Hence, when N is 32, the trigger point may be set to be a Q value of 19, or 25, i.e., about 60 and 80% of the max queue value N, respectively.

After processing the commands, the controller 130 may determine whether the command processing amount in step 1017 exceeds the trigger point. When the command processing amount is lower than the trigger point, the controller 130 may continuously process next commands in step 1015. That is, the controller 130 may receive commands from the host 102, rearrange the commands according to priorities, and control the memory device 150 such that the commands are sequentially processed according to an order of the command queue until the command processing amount reaches the trigger point. When the command processing amount exceeds the trigger point, the controller 130 may recognize this in step 1017 and transmit a response message to the host 102 in step 1019. The response message may include command order information by which commands may be filled in the queue buffer at a max queue value.

According to the command processing method, according to an embodiment of the present invention, when the controller 130 receives commands from the host 102 a response is delayed until the trigger point is reached, so that it is possible to reduce the read and/or write latencies and thus improve the QoS performance of the data processing system. That is, according to the command queue processing method, according to an embodiment of the present invention, the controller 130 is able to internally process commands stored in the queue buffer without responding to the host 102 until a predetermined trigger point is reached. Consequently, the data processing system does not transmit a response message to the host 102 in each command processing, so that it is possible to reduce a command communication time and thus can reduce the read and write latencies.

The memory control device and method in accordance with the aforementioned embodiments is advantageous in that, when a plurality of commands are processed by a queue operation and the like, commands are not ordered to the host until a trigger point is reached, so that it is possible to reduce a time due to frequent command ordering. Furthermore, when the number of commands to be processed reaches the trigger point, commands to be subsequently processed are ordered to the host and commands, which are received from the host, are rearranged according to priorities, so that it is possible to efficiently control an operation of the memory device.

Hereinbelow, with reference to FIGS. 11 to 16, detailed descriptions will be made for electronic devices employing a memory system, according to various embodiments of the present invention.

Figure 11:
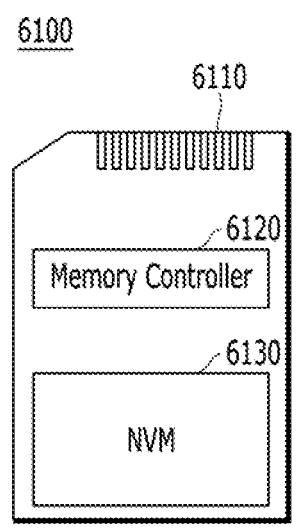
FIGS. 11 to 16 are block diagrams illustrating examples of a data processing system including a memory system according to various embodiments of the present invention.

FIG. 11 is a diagram illustrating an example of a data processing system including a memory system according to an embodiment of the present invention. For example, in FIG. 11, a memory card system 6100 employing a memory system is shown, according to an embodiment of the present invention.

Referring now to FIG. 11, the memory card system 6100 is provided, according to an embodiment of the present invention.

The memory card system 6100 may include a memory controller 6120, a memory device, for example, a nonvolatile memory (NVM) 6130, and a connector 6110.

The memory controller 6120 may be operatively connected with the memory device 6130. The memory controller 6120 may access the memory device 6130 for controlling the operations of the memory device 6130. For example, the memory controller 6120 may control the read, write, erase and background operations of the memory device 6130. The memory controller 6120 is also configured to provide an interface between the memory device 6130 and a host (not shown) via the connector 6110. The memory controller 6120 may drive a firmware for controlling the memory device 6130.

The memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random-access memory (RAM), a processing unit, a host interface, a memory interface and an error correction unit.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless fidelity (WI-FI) and Bluetooth. Accordingly, the memory system and the data processing system, according to an embodiment, may be applied to wired/wireless electronic appliances, and in particular, a mobile electronic appliance.

The memory device 6130 may be a nonvolatile memory (NVM). For example, the memory device 6130 may be one of various nonvolatile memory devices such as an erasable and programmable ROM (EPROM), an electrically erasable and programmable ROM (EEPROM), a NAND flash memory, a NOR flash memory, a PRAM, a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may form a solid-state driver (SSD) by being integrated into a single semiconductor device. Furthermore, the memory controller 6120 and the memory device 6130 may form a memory card such as a PC card (for example, Personal Computer Memory Card International Association; PCMCIA), a compact flash card (CF), a smart media card (SM and SMC), a memory stick, a multimedia card (for example, MMC, RS-MMC, MMCmicro and eMMC), an SD card (for example, SD, miniSD, microSD and SDHC) and a universal flash storage (UFS).

Figure 12:
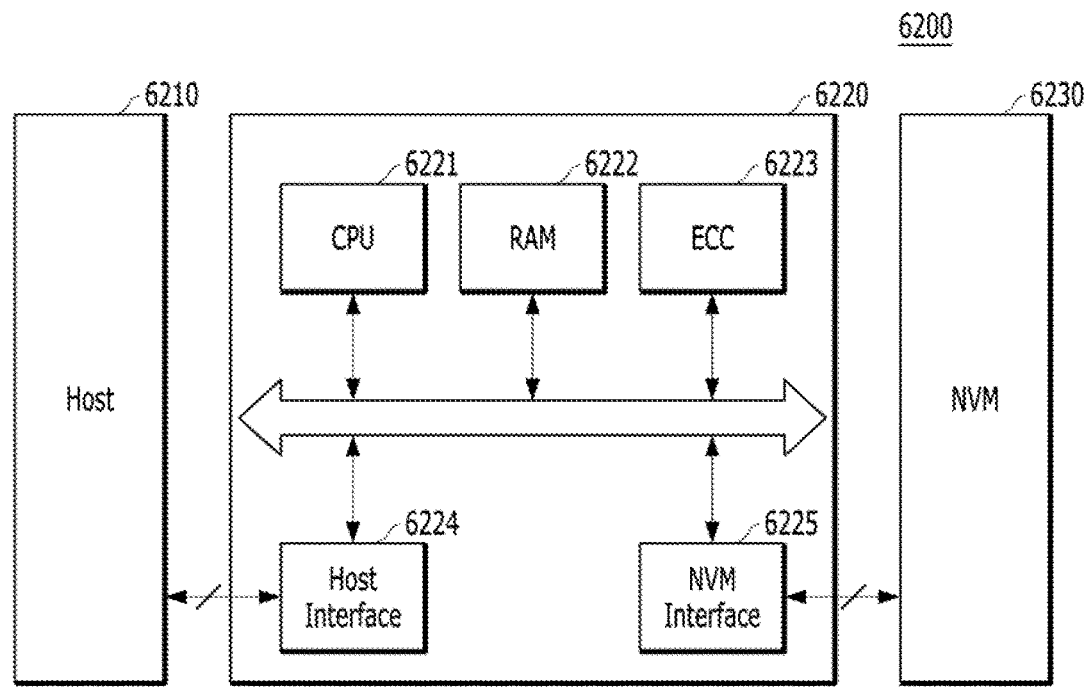

FIG. 12 is a diagram illustrating another example of a data processing system 6200 including a memory system according to an embodiment of the present invention.

Referring to FIG. 12, the data processing system 6200 may include a memory device 6230 which is implemented by at least one nonvolatile memory (NVM) and a memory controller 6220 which controls the memory device 6230. The data processing system 6200 shown in FIG. 12 may be a storage medium such as a memory card for example, a CF, a SD or a microSD, as described above with reference to FIG. 1. The memory device 6230 may correspond to the memory device 150 in the memory system 110 described above with reference to FIG. 1. The memory controller 6220 may correspond to the controller 130 in the memory system 110 described above with reference to FIG. 1.

The memory controller 6220 may control the operations for the memory device 6230 including read, write and erase operations in response to commands received from a host 6210. The memory controller 6220 may include at least one of a central processing unit (CPU) 6221, a buffer memory, for example, a random-access memory (RAM) 6222, an error correction code (ECC) circuit 6223, a host interface 6224, and a memory interface, for example, an NVM interface 6225, all electrically coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case in which the RAM 6222 is used as a work memory, data processed by the CPU 6221 is temporarily stored in the RAM 6222. In the case in which the RAM 6222 is used as a buffer memory, the RAM 6222 may be used to buffer data to be transmitted from the host 6210 to the memory device 6230 or from the memory device 6230 to the host 6210. In the case in which the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. Also, the ECC circuit 6223 may perform error correction encoding for data to be provided to the memory device 6230, and generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using one of various coded modulations such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is implemented, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, and in particular, a mobile electronic appliance.

Figure 13:
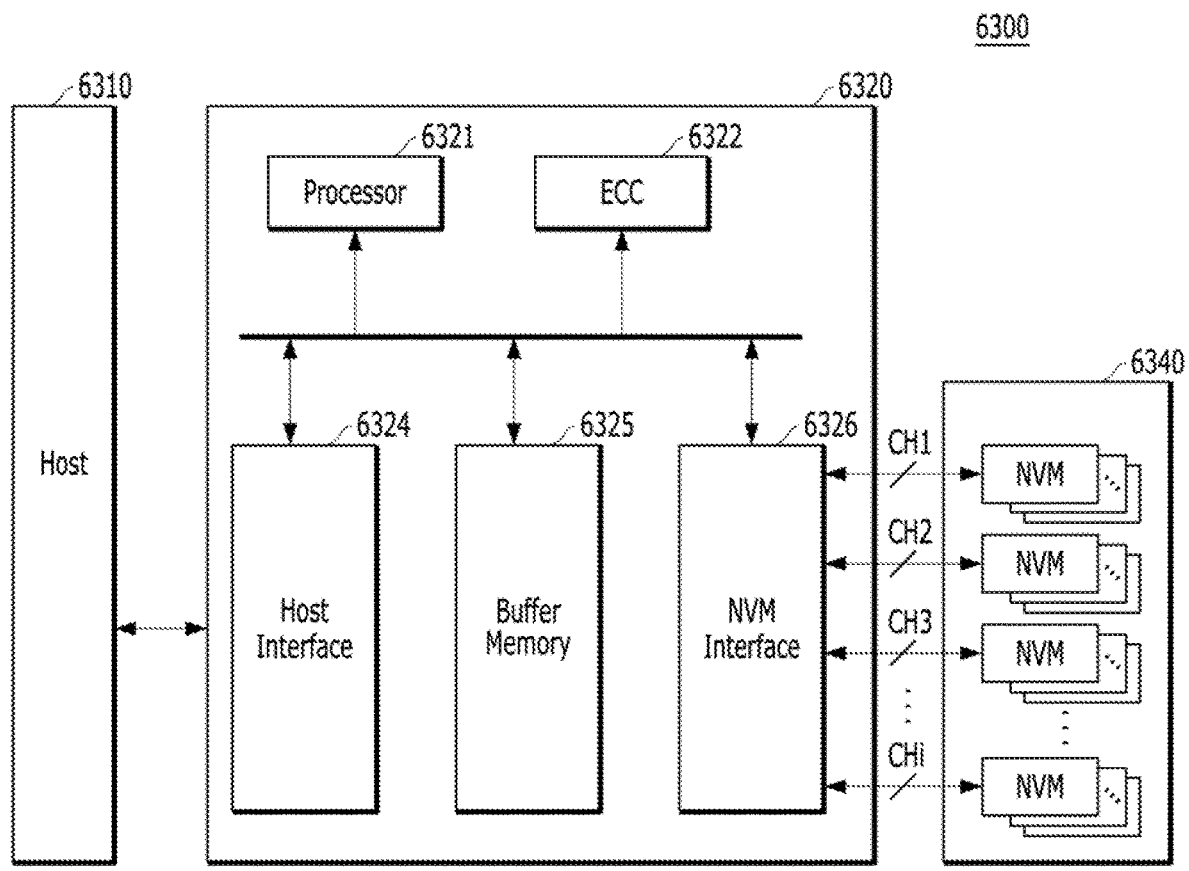

FIG. 13 is a diagram illustrating another example of a data processing system including a memory system according to an embodiment of the present invention. For example, in FIG. 13, a solid-state drive (SSD) 6300 employing a memory system is shown, according to an embodiment of the present invention.

Referring to FIG. 13, the SSD 6300 may include a memory device 6340 which may include a plurality of nonvolatile memories (NVM), and a controller 6320. The controller 6320 may correspond to the controller 130 in the memory system 110 described above with reference to FIG. 1. The memory device 6340 may correspond to the memory device 150 in the memory system 110 described above with reference to FIG. 1.

The controller 6320 may be connected with the memory device 6340 through a plurality of channels CH1, CH2, CH3, . . . , CHi. The controller 6320 may include at least one of a processor 6321, a buffer memory 6325, an error correction code (ECC) circuit 6322, a host interface 6324, and a memory interface such as a nonvolatile memory (NVM) interface 6326.

The buffer memory 6325 may temporarily store data received from a host 6310 or data received from a plurality of nonvolatile memories NVM included in the memory device 6340, or temporarily store metadata of the plurality of nonvolatile memories NVM. For example, the metadata includes map data including mapping tables. The buffer memory 6325 may be implemented by a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). Although it is illustrated in FIG. 12, as an example, that the buffer memory 6325 is disposed inside the controller 6320, it is noted that the buffer memory 6325 may be disposed outside the controller 6320.

The ECC circuit 6322 may calculate error correction code values of data to be programmed in the memory device 6340 in a program operation, perform an error correction operation for data read from the memory device 6340 based on the error correction code values in a read operation, and perform an error correction operation for data recovered from the memory device 6340 in a recovery operation for failed data.

The host interface 6324 may provide an interface function with respect to an external device such as the host 6310. The nonvolatile memory interface 6326 may provide an interface function with respect to the memory device 6340 which is connected through the plurality of channels CH1, CH2, CH3, . . . CHi.

In an embodiment, a redundant array of independent disks (RAID) system is provided, the system including a plurality of SSDs 6300. Each SSD 6300 may employ the memory system 110 described above with reference to FIG. 1. In a RAID system, the plurality of SSDs 6300 and a RAID controller for controlling the plurality of SSDs 6300 may be included. In the case of performing a program operation by receiving a write command from the host 6310, the RAID controller may select at least one memory system, that is, at least one SSD 6300, corresponding to the RAID level information of the write command received from the host 6310, among a plurality of RAID levels, that is, the plurality of SSDs 6300, and may output data corresponding to the write command, to the selected SSD 6300. Also, in the case of performing a read operation by receiving a read command from the host 6310, the RAID controller may select at least one memory system, that is, at least one SSD 6300, corresponding to the RAID level information of the write command received from the host 6310, among the plurality of RAID levels, that is, the plurality of SSDs 6300, and may provide data outputted from the selected SSD 6300, to the host 6310.

Figure 14:
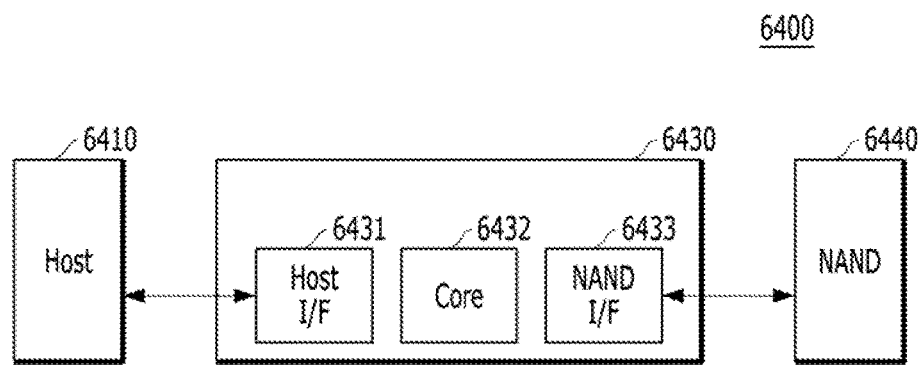

FIG. 14 is a diagram illustrating another example of a data processing system including a memory system, according to an embodiment of the present invention. For example, in FIG. 14, an embedded multimedia card (eMMC) 6400 employing a memory system is shown, according to an embodiment of the present invention.

Referring to FIG. 14, the eMMC 6400 may include a memory device 6440 which is implemented by at least one NAND flash memory, and a controller 6430. The controller 6430 may correspond to the controller 130 in the memory system 110 described above with reference to FIG. 1. The memory device 6440 may correspond to the memory device 150 in the memory system 110 described above with reference to FIG. 1.

The controller 6430 may be connected with the memory device 6440 through a plurality of channels indicated by the two-headed arrow. The controller 6430 may include a host interface 6431, at least one core 6432, and a memory interface, for example, a NAND interface 6433.

The core 6432 may control the operations of the eMMC 6400, the host interface 6431 may provide an interface function between the controller 6430 and a host 6410, and the NAND interface 6433 may provide an interface function between the memory device 6440 and the controller 6430. For example, the host interface 6431 may be a parallel interface such as an MMC interface, as described above with reference to FIG. 1, or may be a serial interface such as an ultra-high speed (UHS)-I/UHS-II and a universal flash storage (UFS) interface.

Figure 15:
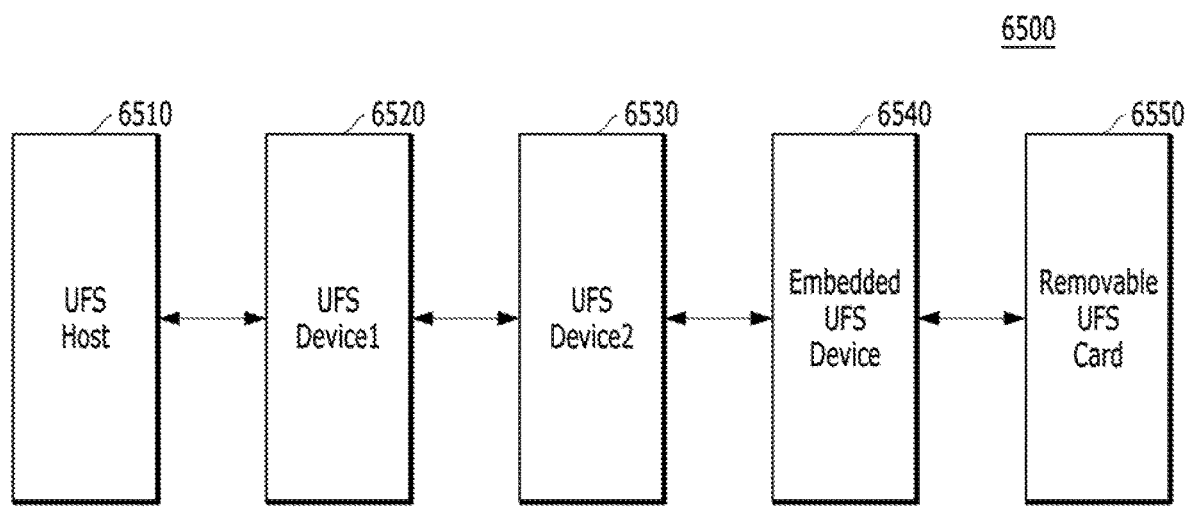

FIG. 15 is a diagram illustrating another example of a data processing system including a memory system, according to an embodiment of the present invention. For example, in FIG. 15, a universal flash storage (UFS) system 6500 employing a memory system is shown, according to an embodiment of the invention.

Referring to FIG. 15, the UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, and in particular, a mobile electronic appliance.

The UFS host 6510, the UFS devices 6520 and 6530, the embedded UFS device 6540 and the removable UFS card 6550 may respectively communicate with external devices, that is, wired/wireless electronic appliances, and in particular, a mobile electronic appliance, through a UFS protocol. The UFS devices 6520 and 6530, the embedded UFS device 6540 and the removable UFS card 6550 may be implemented as the memory system 110 described above with reference to FIG. 1, and in particular, as the memory card system 6100 described above with reference to FIG. 11. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), a multimedia card (MMC), secure digital (SD), mini SD and Micro SD.

Figure 16:
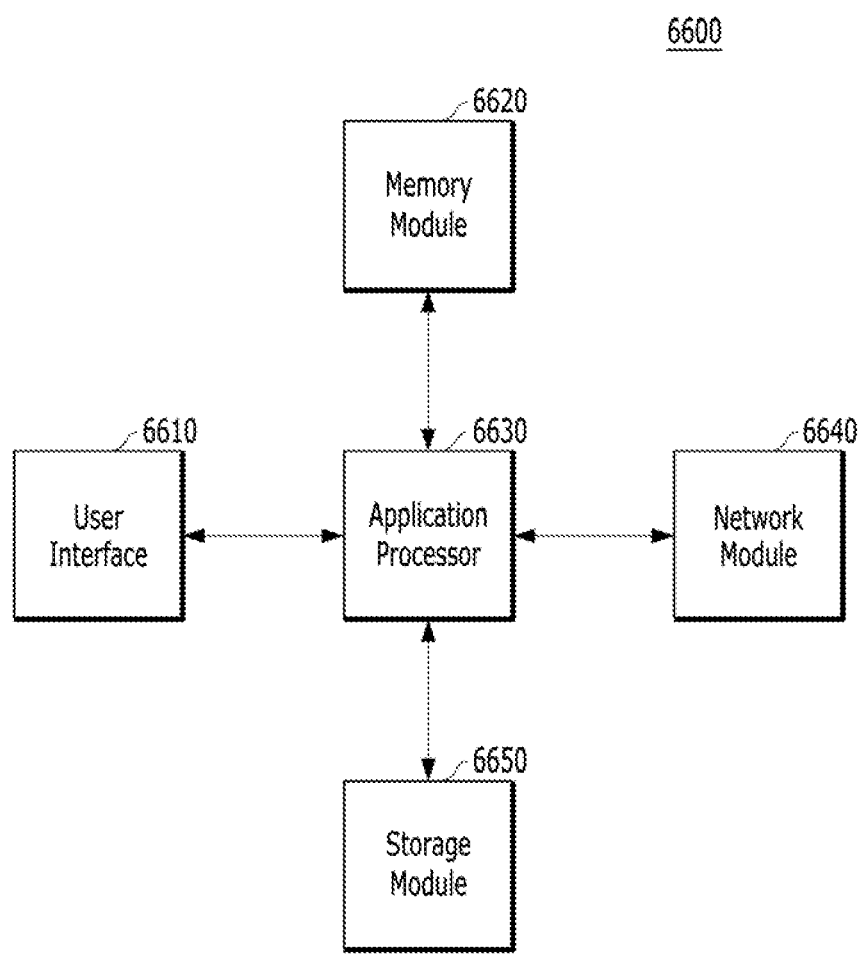

FIG. 16 is a diagram illustrating another example of a data processing system including a memory system according to an embodiment of the present invention. For example, in FIG. 16, a user system 6600 employing a memory system is shown, according to an embodiment of the present invention.

Referring to FIG. 16, the user system 6600 may include a user interface 6610, a memory module 6620, an application processor 6630, a network module 6640, and a storage module 6650.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided as a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a ReRAM, a magnetic random access memory (MRAM) and a ferroelectric random access memory (FRAM). For example, the application processor 6630 and the memory module 6620 may be mounted as a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and so on, and may thereby communicate with wired/wireless electronic appliances, and in particular, a mobile electronic appliance. Accordingly, the memory system and the data processing system may be applied to wired/wireless electronic appliances. The network module 6640 may be included in the application processor 6630.

The storage module 6650 may store data such as data received from the application processor 6630, and transmit data stored therein, to the application processor 6630. The storage module 6650 may be implemented by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may also be provided as a removable storage medium such as a memory card of the user system 6600 and an external drive. That is, the storage module 6650 may correspond to the memory system 110 described above with reference to FIG. 1, and may be implemented as the SSD, eMMC and UFS described above with reference to FIGS. 13 to 15.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case in which the memory system 110 described above with reference to FIG. 1 is applied to the mobile electronic appliance of the user system 6600 according to an embodiment, the application processor 6630 may control the operations of the mobile electronic appliance, and the network module 6640 as a communication module controls wired/wireless communication with an external device, as described above. The user interface 6610 as the display/touch module of the mobile electronic appliance displays data processed by the application processor 6630 or supports input of data from a touch panel.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device; and
a controller operatively coupled to the memory device,
wherein the controller comprises:
a receiving unit configured to receive a plurality of commands for the memory device from a host, and
a command processing unit configured to process the plurality of commands and send a single response corresponding to the plurality of processed commands to the host when the number of the plurality of processed commands reaches a trigger point,
wherein the processed commands include at least one of a read command or a write command,
wherein the trigger point is the number of commands corresponding to a predetermined percentage of the max queue depth.

2. The memory system of claim 1, wherein the trigger point is determined by a calculation of Q/N where N is a maximum number of the commands to be stored in the command queue and Q is a number of processed commands in the command queue.

3. The memory system of claim 1, wherein the command processing unit rearranges the commands on a basis of a priority and sequentially processes the rearranged commands,
wherein the priority includes at least one of a data size corresponding to commands or a command type of commands.

4. The memory system of claim 3, wherein the priority further includes a number of times by which commands have not been processed in the previous state.

5. The memory system of claim 4, wherein the command processing unit rearranges the commands such that a command not processed beyond a preset number of times in a previous command processing operation has a highest priority.

6. The memory system of claim 3, wherein the command processing unit rearranges the commands such that a command corresponding to a data size smaller than a reference size has a priority relatively higher than a priority of a command corresponding to a data size larger than the reference size.

7. The memory system of claim 6, wherein the command processing unit rearranges the commands such that a read command has a priority relatively higher than a priority of a write command.

8. The memory system of claim 3, wherein the priority includes a command type including the write command and the read command,
   wherein the read command has a higher priority than that of the write command.

9. The memory system of claim 1, wherein the single response further includes at least one of a command processing completion, an order for requesting next command or command number information for allowing a queue buffer for buffering the plurality of commands to reach a max queue depth.

10. A memory controller comprising:
   a receiving unit configured to receive a plurality of commands for a memory device from a host; and
   a command processing unit configured to process the plurality of commands, and send a single response to the processed commands to the host when the number of the processed commands reaches a trigger point,
   wherein the processed plurality of commands include at least one of a read command or a write command,
   wherein the trigger point is the number of commands corresponding to a predetermined percentage of the max queue depth.

11. The memory controller of claim 10, wherein the trigger point is determined by a calculation of Q/N where N is a maximum number of the commands to be stored in the command queue and Q is a number of processed commands in the command queue.

12. The memory controller of claim 10, wherein the command processing unit rearranges the commands on a basis of a priority and sequentially processes the rearranged commands,
   wherein the priority includes at least one of a data size corresponding to commands or a command type of commands.

13. The memory controller of claim 12, wherein the priority further includes a number of times by which commands have not been processed in the previous state.

14. The memory controller of claim 13, wherein the command processing unit rearranges the commands such that a command not processed beyond a preset number of times in a previous command processing operation has a highest priority.

15. The memory controller of claim 12, wherein the command processing unit rearranges the commands such that a command corresponding to a data size smaller than a reference size has a priority relatively higher than a priority of a command corresponding to a data size larger than the reference size.

16. The memory controller of claim 15, wherein the command processing unit rearranges the commands such that a read command has a priority relatively higher than a priority of a write command.

17. The memory controller of claim 10, wherein the single response further includes at least one of a command processing completion, an order for requesting next command or command number information for allowing a queue buffer for buffering the plurality of commands to reach a max queue depth.

18. The memory controller of claim 10, wherein the priority includes a command type including the write command and the read command,
   wherein the read command has a higher priority than that of the write command.

19. An operation method of a memory system, comprising:
   receiving a plurality of commands for a memory device from a host;
   continuously processing the plurality of commands; and
   sending a single response including to the host when the number of the processed commands reaches a trigger point,
   wherein the processed plurality of commands include at least one of a read command or a write command,
   wherein the trigger point is the number of commands corresponding to a predetermined percentage of the max queue depth.

20. The operation method of the memory system of claim 19, wherein the trigger point is determined by a calculation of Q/N where N is a maximum number of the commands to be stored in the command queue and Q is a number of processed commands in the command queue.

21. The operation method of the memory system of claim 19, wherein the processing of the commands comprises:
   rearranging the commands on a basis of a priority; and
   sequentially processing the rearranged commands,
   wherein the priority includes at least one of a data size corresponding to commands or a command type of commands.

22. The operation method of the memory system of claim 21, wherein the priority further includes a number of times by which commands have not been processed in the previous state.

23. The operation method of the memory system of claim 22, wherein the rearranging of the commands comprises:
   rearranging the commands such that a command not processed beyond a preset number of times in a previous command processing operation has a highest priority.

24. The operation method of the memory system of claim 23, wherein the rearranging of the commands comprises:
   rearranging the commands such that a command corresponding to a data size smaller than a reference size has a priority relatively higher than a priority of a command corresponding to a data size larger than the reference size; and
   rearranging the commands such that a read command has a priority relatively higher than a priority of a write command.

25. The operation method of the memory system of claim 21, wherein the priority includes a command type including the write command and the read command,
   wherein the read command has a higher priority than that of the write command.

26. The operation method of the memory system of claim 19, wherein the single response further includes at least one of a command processing completion, an order for requesting next command or command number information for allowing a queue buffer for buffering the plurality of commands to reach a max queue depth.

* * * * *